(No Model.)
P. R. HARRISON.
ACETYLENE GAS GENERATING LAMP.
No. 596,703. Patented Jan. 4, 1898.
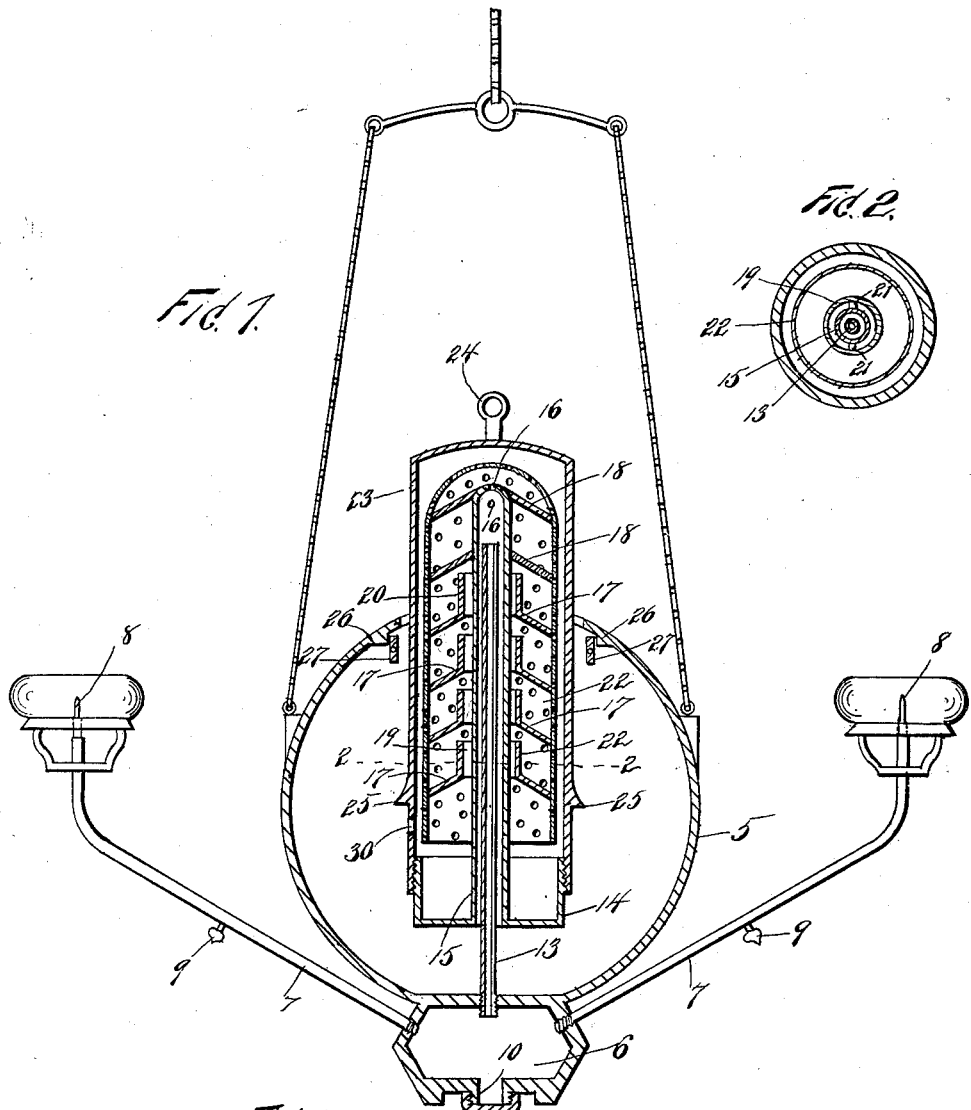

UNITED STATES PATENT OFFICE.

PERCY R. HARRISON, OF NEW YORK, N. Y.

ACETYLENE-GAS-GENERATING LAMP.

SPECIFICATION forming part of Letters Patent No. 596,703, dated January 4, 1898.

Application filed February 27, 1897. Serial No. 625,316. (No model.)

*To all whom it may concern:*

Be it known that I, PERCY R. HARRISON, a subject of the Queen of Great Britain, residing at New York, in the county of New York and State of New York, have invented certain new and useful Improvements in Gas-Lamps, of which the following is a full and complete specification, such as will enable those skilled in the art to which it appertains to make and use the same.

This invention relates to lamps; and the object thereof is to provide an improved illuminating device of this class which is particularly adapted to burn acetylene gas, or a mixture of acetylene and gasolene gas, and which contains within itself apparatus for generating such gas, a further object being to provide a lamp of this class which may be constructed in various forms, so as to serve as a table-lamp, student-lamp, stand-lamp, bracket-lamp, hall-lamp, or as a gaselier, the principle of construction, however, being the same in all cases.

In the drawings forming part of this specification I have shown my invention applied as a gaselier, and the invention is fully disclosed in the following specification, of which the accompanying drawings form a part, in which—

Figure 1 is a sectional side view of a gaselier embodying my invention; Fig. 2, a section on the line 2 2, and Fig. 3 a sectional view of a detail of the construction.

In the drawings forming part of this specification the separate parts of my improvement are designated by the same numerals of reference in all the views, and in the practice of my invention I provide a hollow tank or reservoir 5, which may be of any convenient shape, but which is preferably spherical in form, and said tank or reservoir is open at the top and is adapted to receive water and is provided at the bottom with a chamber 6 of any desired form, the side walls of which are provided at their opposite sides with outwardly-directed tubular arms 7, which are adapted to support gas-burners 8 and which are provided with the usual valve-plugs 9, and the lower side of the chamber 6 is provided centrally with a downwardly-directed tubular opening 10, which is adapted to be closed by a screw-threaded cap 11.

The opening 12 in the top of the tank or reservoir 5 is preferably circular in form, and secured in the bottom of said tank or reservoir and communicating with the chamber 6 is a tube 13, which projects upwardly above the top of the tank or reservoir, and mounted on said tube 13 and movable thereon is a cylindrical receptacle 14, which is provided with a central vertical tube 15, which extends upwardly and which is closed at its upper end and is provided with small perforations 16, and connected with the tube 15 are a plurality of circular plates or disks 17 and 18, four of the former being shown in the drawings and two of the latter.

The circular disks or plates 17 and 18 are directed downwardly and outwardly, and between all of said disks and the tube 15, except the upper two disks 18, is a narrow annular space 19, and each of the disks 17 is provided with an upwardly-directed tubular extension 20, and these disks are connected with the tube 15 by radial arms 21, or this connection may be made in any desired manner.

I also provide a tubular perforated casing 22, which is open at the lower end and closed at the upper end and perforated, and said casing 22 is adapted to be inserted over the disks 17 and 18, as shown in Fig. 1, and to slide thereon or to be held in position thereon by friction, and the tubular perforated casing 22 is inclosed by a cylindrical casing 23, which is closed at the upper end and open at the lower end and provided with a screw-thread by which it is connected with the receptacle 14, which is also cylindrical in form.

The cylindrical casing 23 is provided at its upper end with a handle 24, and formed thereon, near the lower end thereof, are outwardly-directed shoulders or projections 25, and the tank or reservoir 5 is provided at each side of the top opening 12 and slightly below the same with inwardly-directed shoulders or projections 26, and mounted transversely thereof are plates 27, which are secured to or mounted on rods 28, which pass through the sides of the top of the tank or reservoir and one end of each of which is provided with a knob or head 29, and by pulling upwardly on the handle 24 of the casing 23 the said casing and the parts connected therewith, including the receptacle 14, the tube 15, the disks or plates 17 and 18, and the perforated cylindrical casing 22, may be raised, as will be readily understood, and when the shoulders or projections 25 have passed the plates 27 said plates may be turned down, so that they will abut against the shoulders or projections 26 and so that the shoulders or projections 25 on the casing 23 will rest thereon and support said casing 23 and the parts connected therewith in a raised position, and when it is desired to lower the same it is again slightly raised and the plates 27 turned downwardly, as shown in Fig. 1.

The casing 23, the receptacle 14, the tube 15, which is formed on or secured to said receptacle, the downwardly-inclined disks or plates 17 and 18, and the perforated casing 22 constitute the gas-generator, and the operation will be readily understood from the foregoing description when taken in connection with the accompanying drawings and the following statement thereof.

The generator is free to move on the tube 13, the tube 15 being slightly greater in diameter than said tube 13, and when it is desired to prepare the lamp for use the generator is removed from the tank or reservoir 5 and the cylindrical casing 23 is detached from the receptacle 14, after which the perforated tubular casing 22 is also detached. The remaining part of the generator, consisting of the receptacle 14, the tube 15, and the disks or plates 17 and 18, is then inverted and the space between the said disks or plates and the space between the upper disk or plate 17 and the lower disk or plate 18 are filled with calcic carbid, and the tubular perforated casing 22 is replaced as this operation is performed and while the said parts are held in an inverted position, and this casing securely holds the calcic carbid in place, after which the casing 23 is secured to the receptacle 14, and the generator is again placed in the tank or reservoir, which is partially filled with water. The cocks or valves 9 are then opened, and the weight of the generator and its contents, which may be further weighted, if necessary, forces the air within it through the perforations 16 in the top of the tube 15 and downwardly through said tube into the chamber 6, and outwardly through the tubular arms 7 to the burners 8. At the same time the water entering through an opening 30 in the bottom of the casing 23 attacks first the bottom layer of the carbid, whereby acetylene gas is immediately generated, and the disks or plates separating the different layers of the carbid prevent the vapor contained in the rising gases from affecting the upper layers of the carbid before the water reaches them, and the gas passes upward by way of the annular spaces 19 until it reaches the lower disk or plate 18. The top layer of the carbid or that between the upper disks or plates 18 is intended to dry the gas, and said gas passes outwardly beneath the lower disk or plate 18 and is conducted inwardly through the casing 22 and through the upper layer of the carbid and into the tube 15, from which it passes into the tube 13 and downwardly into the chamber 6, and thence to the burners, where it can be ignited.

Any moisture that may be condensed in the tube 13 or the tubular arms 17 passes down into the lower chamber 6, from which it may be removed by removing the cap 11, and when gas is generated more rapidly than is needed for immediate consumption the gas-generator rises and the carbid being raised above the level of the water the generation of the gas ceases until more is needed, when the generator will be automatically lowered. When the first layer of carbid is exhausted, the generator sinks until the second layer touches the water, and so on until all of the carbid is exhausted, and as the carbid is disintegrated the resulting lime sinks to the bottom of the receptacle 14, from which it is removed before the generator is refilled.

If it is desired to burn a mixture of acetylene with gasolene gas instead of pure acetylene, the lower part or receptacle 14 of the generator is filled with gasolene before the generator is placed in the tank or reservoir 5, and as the water enters the generator through the opening 30 the gasolene rises and the heat resulting from the chemical union of the carbon and hydrogen gradually vaporizes the gasolene, thus providing a steady supply of both acetylene and gasolene gas so long as the material lasts. In this operation the vessel containing the carbid sinks until the carbid, having passed through the gasolene, comes in contact with the water beneath, whereupon acetylene gas is generated, and this mechanical action heats the water, which in turn heats the gasolene or oil, which in consequence is gradually converted into vapor.

Instead of placing the gasolene in the receptacle 14 a separate vessel within the generator and in close proximity to the rising acetylene may be employed, and it will be apparent that any desired number of the disks or plates 17 and 18 may also be employed, but in practice I prefer to employ two or more of the disks or plates 18 and four or more of the disks or plates 17, and in all cases these disks or plates are preferably downwardly directed, so as to form chambers or receptacles when the tube 15, to which they are attached, is inverted.

It will thus be seen that I accomplish the object of my invention by means of a device which is simple in construction and operation, and it will be apparent that changes in and modifications of the construction herein described may be made without departing from the spirit of my invention or sacrificing its advantages.

Having fully described my invention, I claim as new and desire to secure by Letters Patent—

1. The herein-described lamp, which comprises a tank or reservoir, which is provided at its lower side with a chamber, with which are connected burner arms or tubes, said chamber being also provided with a central tube which projects upwardly through said tank or reservoir, and which is open at its upper end, and a gas-generator which is mounted on said tube, and adapted to move thereon, said generator consisting of a bottom receptacle provided with an upwardly-directed tube, said tube being provided with outwardly and downwardly directed plates or disks, between all of which and said tube except the upper plates or disks are spaces, said plates or disks being inclosed by a detachable perforated tube, which is open at the bottom, and a detachable casing which is adapted to inclose said detachable perforated tube, and to be connected with said receptacle, substantially as shown and described.

2. A lamp, comprising a reservoir or tank as 5, to the bottom of which is secured a receptacle as 6, which is provided with burner tubes or arms 7, said receptacle being also provided with a tube as 13, which passes upwardly through the tank or reservoir, and a vertically-movable generator, comprising a receptacle as 14, provided with a central tube as 15, on which are mounted downwardly-directed annular disks or plates as 17, and 18, said disks or plates being inclosed in a detachable tubular casing which is open at its lower end, and said tubular casing being inclosed in a cylindrical casing, which is open at its lower end, and adapted to be connected with said receptacle 14, substantially as shown and described.

In testimony that I claim the foregoing as my invention I have signed my name, in presence of the subscribing witnesses, this 20th day of January, 1897.

PERCY R. HARRISON.

Witnesses:
THOS. A. AITON,
GEO. E. CRUSE.